United States Patent Office 3,065,381
Patented Nov. 20, 1962

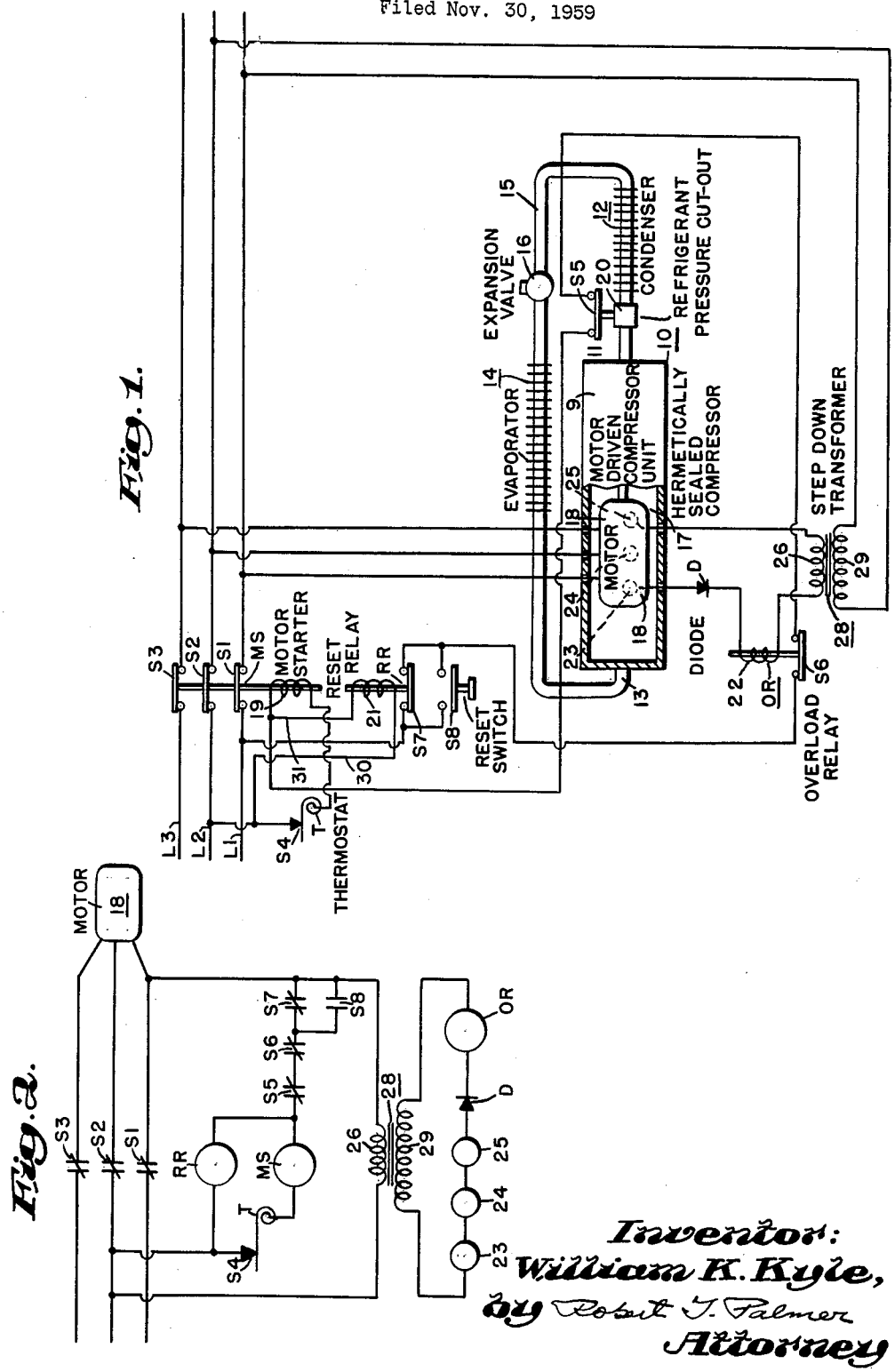

3,065,381
SAFETY CONTROL CIRCUITS FOR THE MOTORS OF HERMETICALLY SEALED REFRIGERANT COMPRESSORS

William K. Kyle, Staunton, Va., assignor to Westinghouse Electric Corporation, East Pittsburgh, Pa., a corporation of Pennsylvania
Filed Nov. 30, 1959, Ser. No. 856,189
3 Claims. (Cl. 317—13)

This invention relates to control circuits for electric motors used in hermetically sealed refrigerant compressors to drive the compressor units of such compressors.

As disclosed in the U.S. Patent No. 2,818,535 of A. E. Skeats and G. L. Biehn, the motors of refrigerant compressors can be protected by safety switches connected to the magnetic starters of such motors. Such safety switches usually include refrigerant pressure operated switches which act to stop the compressor motors if the refrigerant pressure is too high or too low, and include overload relays which respond to excessive current flow through the motors. Such current responsive, overload relays are magnetically operated relays as disclosed in said patent, or the equivalent thermal relays.

Such overload relays are not suited to the protection of the motors of hermetic compressors which are cooled by the passage of refrigerant vapors over their surfaces as disclosed in the U.S. Patent No. 2,283,024 of E. R. Wolfert. In hermetic compressors, high motor temperatures occur at light load (low current) conditions resulting from the reduced refrigerant flow and the reduced motor cooling at light loads. The conventional magnetic and thermal relays which respond to excessive motor current do not provide adequate protection.

Another disadvantage of a magnetic relay is that it has no memory as to whether a motor is hot or cold, so that its trip time remains constant whether it is the first or tenth trip. A thermal relay, while it has a memory, is affected by ambient temperatures which may cause it to act slower or faster than is justified by the temperature of an associated motor.

Other disadvantages of conventional overload relays are that it is possible to start their associated motors while their temperatures are above safe limits, and the relays must be matched to the motors with which they are used, requiring many different capacity relays for the many different sizes of motors.

This invention uses an overload relay having all of the advantages but none of the disadvantages of conventional overload relays. It has an energizing winding connected in series with a source of current and one or more semiconductors exposed directly to the temperature of the associated motor, and having a positive temperature coefficient of resistance. Such semiconductors may be PbSe, BaTiO₃ or single crystal silicon which have electrical resistances which increase rapidly with increases in temperature, and which can be constructed to have largest increases in resistances at critical motor temperatures. Such semiconductor resistors are very small. Being semiconductors, they require little mass of insulation. The thermal lag between the motor temperatures and their temperatures is small, and their response to motor temperature changes is accurate.

In one embodiment of this invention, the energizing winding of an overload relay has several such semiconductors connected in series with it and a source of current. The semiconductors are directly exposed to the temperature of an associated motor as by being imbedded in its windings or in contact with their surfaces. The relay is normally energized since the resistance of the semiconductors at operating temperatures is sufficiently low to permit energizing current to flow through the relay winding. This is a fail safe circuit since if anything happens to the relay circuit such as a short or open circuit, the relay will be deenergized and will open the motor circuit. When abnormal temperatures occur in the motor as a result of a failure of some component of the motor, the compressor or the system, the resistance of the semiconductors will increase sufficiently to decrease the current through the relay winding below relay energizing value, so that the relay will be deenergized and will open its safety switch, stopping the motor.

The control circuit of this invention also includes an improved reset circuit in which a manually operated reset switch can be temporarily closed to start the compressor motor, and which, when closed, energizes a reset relay which establishes a holding circuit for maintaining the motor energized after the reset switch is opened. This reset circuit is simpler and has fewer components than prior reset circuits.

An object of this invention is to improve control circuits for the motors of hermetically sealed refrigerant compressors.

Another object of this invention is to protect the driving motor of a hermetically sealed refrigerant compressor with an overload relay which has in its energizing circuit, one or more semiconductors which have a positive temperature coefficient, and which are directly exposed to the temperature of the motor.

Another object of this invention is to improve reset circuits for motors driving refrigerant compressors.

This invention will now be described with reference to the annexed drawings, of which:

FIG. 1 is a diagrammatic view of a refrigeration system including a control circuit embodying this invention, and FIG. 2 is a simplified circuit schematic of the control circuit.

A hermetically sealed, refrigerant compressor 10 has a discharge gas outlet 11 connected to a conventional condenser 12, and has a suction gas inlet 13 connected to a conventional evaporator 14. The evaporator 14 is connected to the condenser 12 by a tube 15 containing a conventional expansion valve 16. The compressor has a suction gas passage 17 connected to the inlet 13, and which contains an electric motor 18 which drives compressor unit 9. Refrigerant gas drawn through the passage 17 cools the motor 18 as disclosed in said Wolfert patent.

The motor 18 is connected through switches S1, S2 and S3 of magnetic starter MS to three-phase supply lines L1, L2 and L3 respectively. The starter MS has an energizing winding 19 connected in series with switch S4 of thermostat T, switch S5 of refrigerant pressure cut-out 20, switch S6 of overload relay OR, and switch S7 of reset relay RR, across the lines L1 and L2.

The reset relay RR has an energizing winding 21 connected at one end through wire 30 to the supply line L2, and connected at its other end through wire 31 to the end of the starter winding which is connected to the switch S5.

The overload relay OR has an energizing winding 22 which is connected in series with a diode D, semiconductors 23, 24 and 25, and secondary winding 26 of step-down transformer 28, the primary winding 29 of which is connected to the supply lines L1 and L2.

A manually operated, pushbutton switch S8 has its contacts connected to the contacts of the switch S7 of the reset relay RR.

The pressure cut-out 20 responds to refrigerant discharge pressure, and may be a high or low pressure cut-out or may be both.

The semiconductors 23, 24 and 25 are of the positive temperature coefficient type described in the foregoing, and are designed to have greatly increased resistances at the critical temperature of the motor 18.

When the motor 18 has been stopped by the opening of one of the safety switches S5 or S6, the windings 21 and 19 would be deenergized, and the switches S1—S3 and S7 would open. The motor cannot be restarted when the safety switches S5 and S6 are closed since the switch S7 would be open. To start the motor 18, the pushbutton switch S8 would be momentarily closed. This switch since connected across the open switch S7, completes the energizing circuits of the motor starter MS, and the reset relay RR, starting the motor. At the same time, the reset relay RR would close its switch S7, maintaining the motor 18 and the reset relay RR energized after the reset switch S8, which may be spring biased towards open position, is released and opens.

The winding 21 of the reset relay RR is connected across the series connection of the thermostat T to the starter winding 19 so that it is not energized by the thermostat. The winding 19 is energized from lines L1 and L2 through the series connected switches S4, S5, S6 and S7. The winding 21 is energized through the series connected switches S5, S6 and S7. Thus, the switches S5, S6 and S7 perform the dual functions of energizing both windings 19 and 21 although the thermostat T is also required for energizing the winding 19.

In normal operation, with the thermostat T calling for cooling, the compressor motor 18 would be in operation, with the safety switch S5 closed through the refrigerant pressure being normal, and the safety switch S6 being closed through the motor temperature being normal so that the relay OR is energized.

If the refrigerant pressure should increase or decrease to critical limits, the pressure cut-out 18 would open its switch S5, stopping the motor 18.

If the temperature of the motor 18 should increase to a critical temperature, the resistances of the semiconductors 23, 24 and 25 would increase substantially, substantially reducing the current through the winding of the overload relay OR, deenergizing the latter which would open its safety switch S6 to stop the motor 18.

Experience has shown that due to a fluctuation in line voltage or for some other reason which may cure itself in a short time, a safety switch may open and stop a compressor motor. Automatic restarting should not be used, nor should a manually operated restarting switch which would over-ride the safety switch be used, since the fault may persist.

The reset switch S8 preferably should be mounted on the front of the cabinet enclosing an air cooling unit or in some other convenient location. Frequent requirement for its use would indicate a fault to cure which a serviceman should be called.

What is claimed is:
1. A control circuit for an electric motor enclosed within and driving a hermetically sealed refrigerant compressor, comprising a supply circuit for said motor, a magnetic starter for connecting said motor to said supply circuit, a reset relay having normally open switching means, a normally energized overload relay having normally closed switching means and having an energizing winding, a semiconductor having a positive temperature resistance coefficient enclosed within said compressor in contact with said motor, means for flowing current through said semiconductor and said winding in series, means including said normally open reset relay switching means for connecting said starter to said supply circuit when said reset relay is energized and said reset relay switching means is closed, means including a reset switch for energizing said reset relay from said supply circuit, said reset relay switching means including means connected across said reset switch for energizing said reset relay after said reset switch is open.

2. A control circuit for an electric motor driving a refrigerant compressor, said motor having a supply circuit, having a magnetic starter with a switch for connecting said motor to said supply circuit, having a safety circuit including means responsive to an abnormal condition of said motor connected to said supply circuit, said safety circuit including an overload relay with a safety switch, and having a control switch for starting and stopping said motor, said control circuit comprising a reset relay having a switch, means connecting said safety switch, said reset relay switch, said starter and said control switch in series to said supply circuit, means connecting said reset relay across the series connection of said starter and said control switch, and a reset switch connected across said reset relay switch.

3. A control circuit for an electric motor enclosed within and driving a hermetically sealed refrigerant compressor, said motor having a supply circuit, having a magnetic starter with a switch for connecting said motor to said supply circuit, said control circuit comprising a normally energized overload relay with a normally closed safety switch and an energizing winding, a control switch for starting and stopping said motor, a reset relay having a switch, means connecting said safety switch, said reset relay switch, said starter and said control switch in series to said supply circuit, means connecting said reset relay across the series connection of said starter and said control switch, a reset switch connected across said reset relay switch, a semiconductor having a positive temperature resistance coefficient enclosed within said compressor in contact with said motor, and means for flowing current through said semiconductor and said winding in series.

References Cited in the file of this patent

UNITED STATES PATENTS

| 1,927,512 | Baloun | Sept. 19, 1933 |
| 2,818,535 | Skeats | Dec. 31, 1957 |
| 2,976,463 | Adams | Mar. 21, 1961 |

FOREIGN PATENTS

| 557,707 | Great Britain | Dec. 1, 1943 |
| 522,731 | Belgium | Sept. 30, 1953 |
| 735,755 | Great Britain | Aug. 31, 1955 |